United States Patent
Miyase et al.

(10) Patent No.: US 9,374,485 B2
(45) Date of Patent: Jun. 21, 2016

(54) IMAGE READING APPARATUS AND METHOD OF MANUFACTURING IMAGE READING APPARATUS

(71) Applicant: Brother Kogyo Kabushiki Kaisha, Nagoya-shi, Aichi-ken (JP)

(72) Inventors: Satoshi Miyase, Nagoya (JP); Daisuke Kozaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/841,748

(22) Filed: Sep. 1, 2015

(65) Prior Publication Data

US 2016/0065769 A1 Mar. 3, 2016

(30) Foreign Application Priority Data

Sep. 1, 2014 (JP) ................. 2014-177348

(51) Int. Cl.
  *H04N 1/04* (2006.01)
  *H04N 1/00* (2006.01)
  *H04N 1/10* (2006.01)

(52) U.S. Cl.
  CPC ....... *H04N 1/00557* (2013.01); *H04N 1/00551* (2013.01); *H04N 1/00559* (2013.01); *H04N 1/00564* (2013.01); *H04N 1/00729* (2013.01); *H04N 1/10* (2013.01); *H04N 2201/0081* (2013.01); *H04N 2201/02487* (2013.01); *H04N 2201/02495* (2013.01); *H04N 2201/02497* (2013.01)

(58) Field of Classification Search
  CPC ............ H04N 9/3144; H04N 1/00559; H04N 2201/0094; H04N 1/00281; H04N 1/00535; H04N 1/00554; H04N 1/00557; H04N 1/0083; H04N 1/0249; H04N 1/0433; H04N 1/1013; H04N 1/1017; H04N 1/103; H04N 1/1043
  See application file for complete search history.

(56) References Cited

U.S. PATENT DOCUMENTS

| | | | |
|---|---|---|---|
| 7,855,814 B2 | 12/2010 | Osakabe et al. | |
| 2003/0103781 A1 | 6/2003 | Takahashi et al. | |
| 2007/0201109 A1 | 8/2007 | Osakabe et al. | |
| 2008/0012803 A1* | 1/2008 | Nakano ................ | G03G 15/326 345/82 |
| 2008/0013115 A1* | 1/2008 | Nakano .................... | B41J 29/02 358/1.9 |
| 2010/0061743 A1* | 3/2010 | Uematsu ................ | G03G 5/234 399/38 |
| 2011/0235139 A1* | 9/2011 | Kurokawa .............. | G03G 15/60 358/498 |

(Continued)

FOREIGN PATENT DOCUMENTS

| | | |
|---|---|---|
| JP | 2003-167302 A | 6/2003 |
| JP | 2007-228529 A | 9/2007 |
| JP | 2011-234030 A | 11/2011 |

*Primary Examiner* — Negussie Worku
(74) *Attorney, Agent, or Firm* — Banner & Witcoff, Ltd.

(57) ABSTRACT

An image reading apparatus includes a main unit, an openable unit, a cable connected to the openable unit and routed in the main unit, and a holding member attached to the main unit. The holding member includes a first guide portion configured to hold a first specified portion of the cable. The holding member, with the first guide portion holding the first specified portion of the cable, is configured to move from a first position to a second position. When the holding member is in the first position, the cable has no slack in a second specified portion of the cable, the second specified portion being closer to an end of the cable disposed in the openable unit than the first specified portion. When the holding member is in the second position, the cable has slack in a second specified portion of the cable routed in the main unit.

14 Claims, 10 Drawing Sheets

(56) References Cited

U.S. PATENT DOCUMENTS

| | | | |
|---|---|---|---|
| 2011/0242618 A1* | 10/2011 | Takeuchi | H04N 1/00519 358/474 |
| 2012/0217701 A1* | 8/2012 | Suzuki | B41J 2/175 271/264 |
| 2013/0215182 A1* | 8/2013 | Yatsunami | B41J 11/0095 347/16 |
| 2014/0009799 A1* | 1/2014 | Miura | H04N 1/00551 358/474 |
| 2014/0009801 A1* | 1/2014 | Osakabe | H04N 1/00997 358/497 |
| 2014/0132652 A1* | 5/2014 | Nakamura | G03G 15/5075 347/1 |
| 2014/0168680 A1* | 6/2014 | Shiomi | H04N 1/00907 358/1.13 |

* cited by examiner

IMAGE READING APPARATUS AND METHOD OF MANUFACTURING IMAGE READING APPARATUS

CROSS REFERENCE TO RELATED APPLICATION

This application claims priority from Japanese Patent Application No. 2014-177348, filed on Sep. 1, 2014, which is incorporated herein by reference in its entirety.

TECHNICAL FIELD

Aspects of the disclosure relate to an image reading apparatus and a method of manufacturing the image reading apparatus.

BACKGROUND

A known image reading apparatus includes a main unit, a reading unit, an openable unit, a feeding unit, and a cable.

The main unit has a document support surface to support a document on the document support surface. The reading unit is disposed in the main unit. The reading unit reads an image of the document supported on the document support surface. The openable unit is coupled to the main unit such that it is pivotable about an axis and movable up and down. The openable unit is pivotable between a closed position where the document support surface is covered and a released position where the document support surface is exposed. The feeding unit is disposed in the openable unit. The feeding unit is capable of feeding a sheet along a specified feed path such that the reading unit reads an image of the sheet. One end of the cable is connected to an electronic component accommodated in the openable unit. The other end of the cable is led in the main unit, and then connected to a control unit disposed in an image forming unit disposed below the main unit.

An introduction portion and a holding member are disposed at a rear of the main unit. The introduction portion is recessed from the rear of the main unit toward inside of the main unit. The cable pulled out from the openable unit is led into the introduction portion. The holding member is covered by a cover attached to the rear of the main unit. In the image reading apparatus, slack in the cable is produced at the rear of the main unit by the holding member such that the cable follows pivoting and up-and-down movements of the openable unit.

SUMMARY

In the above image reading apparatus, however, the slack in the cable is exposed to the rear of the main unit. In addition, the cover covering the holding member attached to the introduction portion is assembled to the rear of the main unit. Thus, there is a problem that the configuration at the rear of the main unit becomes complicated, which impairs the appearance of the image reading apparatus. To improve the appearance of the image reading apparatus, it is considered that the slack is accommodated in the introduction portion. In this case, however, variations in the degree of the slack in the cable may cause another problem. In one example, when there is not excess slack in the cable, the cable is stretched taut when the openable unit is opened or closed, which may impair the pivoting movement and up-and-down movement of the openable unit. When there is too much slack in the cable, the cable may be pinched between the openable unit and the main unit. As a result, it will become difficult to allow the cable to follow pivoting and up-and-down movements of the openable unit.

Illustrative aspects of the disclosure provide an image reading apparatus having an enhanced appearance quality and configured to allow a cable to appropriately follow pivoting and up-and-down movements of an openable unit.

According to an aspect of the disclosure, an image reading apparatus includes a main unit, an openable unit coupled to the main unit, a cable, and a holding member attached to the main unit and configured to hold the cable. The main unit includes a facing surface including a document support surface configured to support a document on the document support surface, and a reading unit disposed in the main unit. The reading unit is configured to read an image of the document supported on the document support surface. The openable unit is configured to move up and down relative to the main unit and to pivot about an axis between a closed position where the document support surface of the main unit is covered and a released position where the document support surface of the main unit is exposed. The openable unit includes an electric component accommodated in the openable unit, and a feeding unit configured to feed a sheet along a feed path. The reading unit of the main unit is configured to read an image of the sheet fed along the feed path. The cable is connected to the electric component of the openable unit and routed in the main unit. The holding member includes a first guide portion configured to guide the cable in a specified direction within the main unit and hold a first specified portion of the cable. The holding member attached to the main unit, with the first guide portion holding the first specified portion of the cable, is configured to move from a first position to a second position. When holding member is in the first position, the cable has no slack in a second specified portion of the cable, the second specified portion being closer to an end of the cable disposed in the openable unit than the first specified portion. When the holding member is in the second position, the cable has slack in a second specified portion of the cable routed in the main unit.

With this structure, the image reading apparatus has an enhanced appearance quality and allows the cable to appropriately follow pivoting and up-and-down movements of the openable unit.

According to another aspect of the disclosure, a method of manufacturing an image reading apparatus includes: locating an openable unit in a closed position; attaching a holding member, in a first position, to a main unit; putting a cable in the holding member attached in the first position to the main unit such that a first guide portion holds a first specified portion of the cable and the cable has no slack in a second specified portion of the cable, the second specified portion being closer to an end of the cable disposed in the openable unit than the first specified portion; and moving the holding member to a second position such that the first guide portion holds the first specified portion of the cable and the cable is slack in the second specified portion of the cable, the holding member being closer to the openable unit in the second position than in the first position.

According to the method of manufacturing, in the locating, the operation can be conducted with the openable unit being in the closed position. This reduces fluctuations in the position of a portion of the cable pulled out from the openable unit relative to the main unit. Thus, in the attaching in the first position, the position of the portion of the cable, pulled out from the openable unit, relative to the holding member, positioned relative to the main unit, does not vary greatly. In the putting, the first specified portion of the cable can be accurately held by the first guide portion of the holding member, and the cable has no slack in the second specified portion of the cable held by the holding member attached in the first position to the main unit. Thus, in the moving, the cable has slack in the second specified portion of the cable. As the first guide portion of the holding member holds the first specified portion of the cable, the slack in the second specified portion of the cable can be accurately maintained within the main unit. As a result, in the image reading apparatus obtained by the manufacturing method, the slack in the cable can be maintained to a predetermined appropriate amount. Thus, the image reading apparatus has a low probability of occurrence of problems caused by insufficient or excessive degree of slack in the cable. If the slack is too small, the cable having extended to its full length may hinder the openable unit from pivoting and moving up and down, and if the slack is too large, the cable may get caught between the openable unit and the main unit.

In the image reading apparatus obtained by the manufacturing method, the slack in the cable and the holding member are not exposed to the rear of the main unit. The cable does not detract from the appearance of the image reading apparatus.

With the manufacturing method, the image reading apparatus has an enhanced appearance quality and allows the cable to appropriately follow the pivoting and up-and-down movements of the openable unit.

BRIEF DESCRIPTION OF THE DRAWINGS

Reference is made to the following description taken in connection with the accompanying drawings, like reference numerals being used for like corresponding parts in the various drawings.

DETAILED DESCRIPTION

An embodiment of the disclosure will be described with reference to the following drawings.

Figure 1:
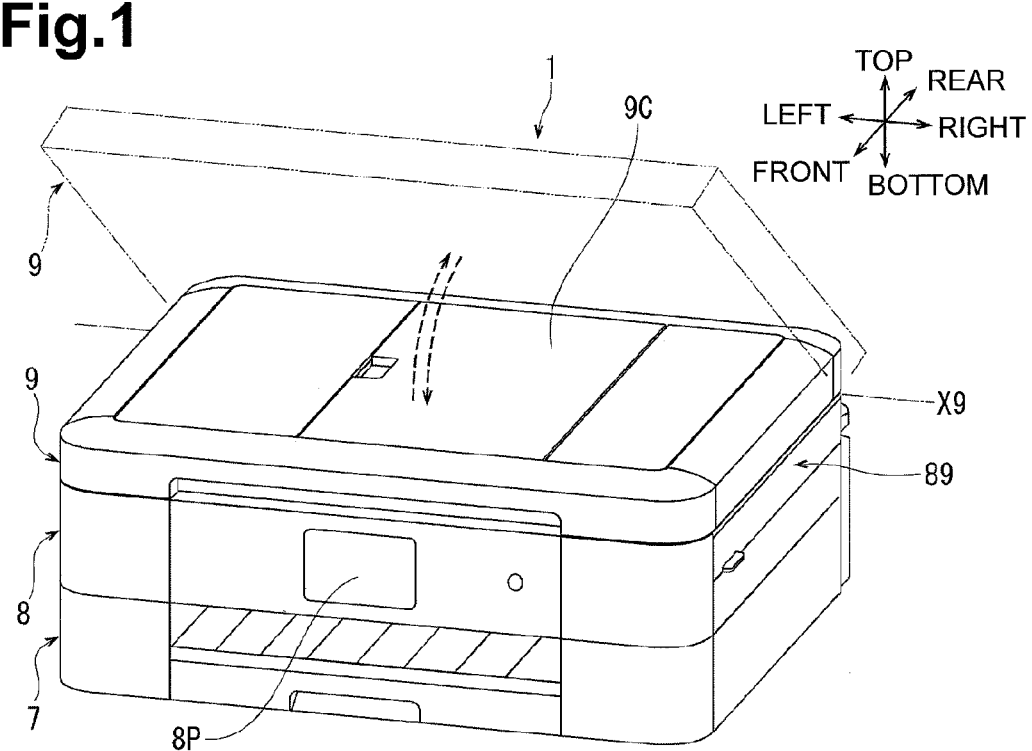
FIG. 1 is a perspective view of an image reading apparatus when viewed from a front side according to an illustrative embodiment.

As illustrated in FIG. 1, an image reading apparatus 1 according to an illustrative embodiment is an example of the image reading apparatus of the disclosure. In FIG. 1, directions of "front", "rear", "right", "left", "upper or top", and "lower or bottom" are indicated based on that a side of the image reading apparatus 1 on which an operation panel 8P is disposed is defined as the front side of the image reading apparatus 1, and a left side of the image reading apparatus 1 when viewed in front of the operation panel 8P is defined as a left side of the image reading apparatus. The directions in drawings on FIG. 2 or later are indicated based on those in FIG. 1. The following will describe elements included in the image reading apparatus 1 with reference to FIG. 1.

General structure of the image reading apparatus 1 will be described.

As illustrated in FIGS. 1-6, the image reading apparatus 1 includes a recording unit 7, a main unit 8, an openable unit 9, an image forming unit 5, a reading unit 3, a feeding unit 4, and a control unit C1. The recording unit 7 and the main unit 8 have a box shape with substantially flat surfaces. The main unit 8 is disposed on top of the recording unit 7. As illustrated in FIG. 1, a front surface of the main unit 8 contains a touch panel, e.g., an operation panel 8P.

Figure 2:
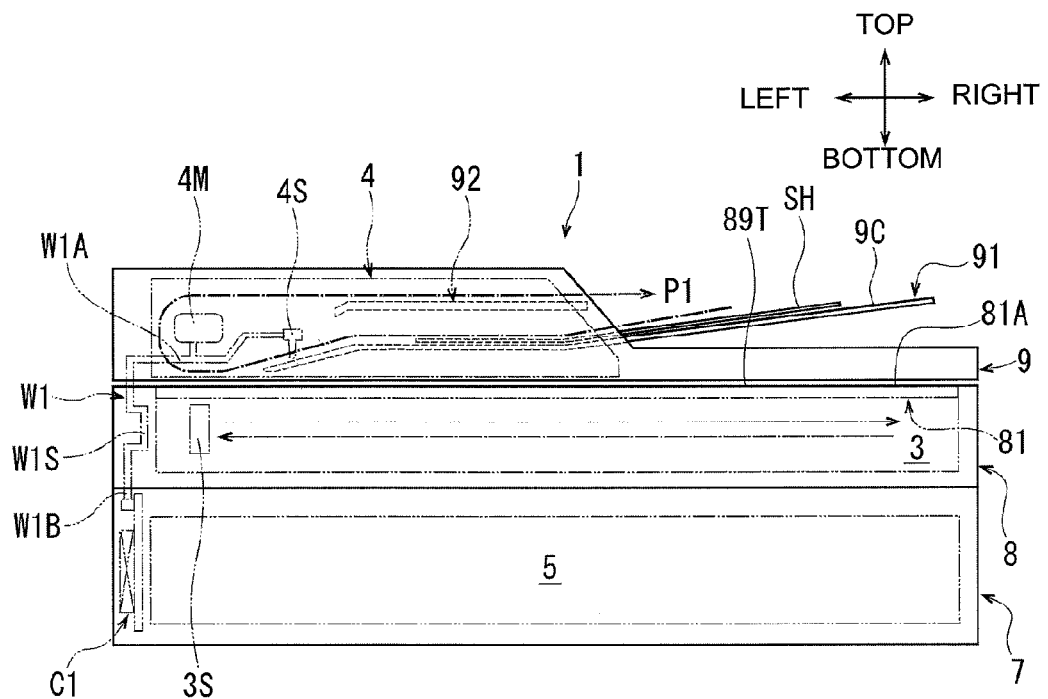
FIG. 2 is a front view in schematic form illustrating the image reading apparatus.

As illustrated in FIG. 2, the image forming unit 5 is accommodated in the recording unit 7. The image forming unit is configured to form an image on a sheet by inkjet or laser printing. The reading unit 3 is accommodated in the main unit 8. The reading unit 3 is used when reading an image of a document.

Figure 6:
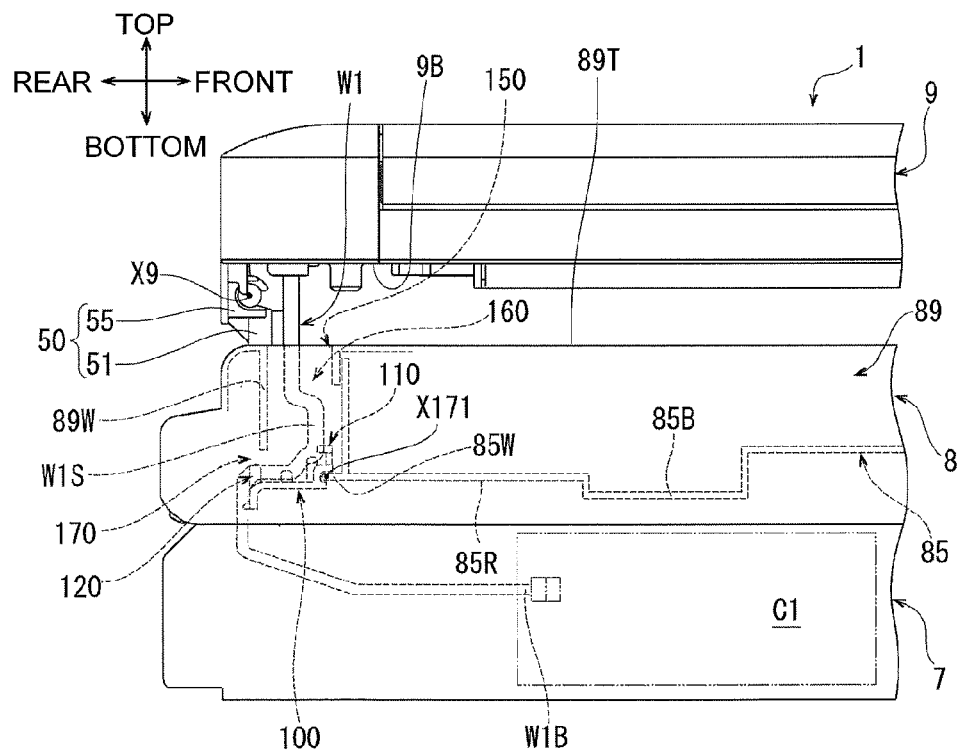
FIG. 6 is a partial side view illustrating the introduction portion and the cable with the openable unit being elevated from the closed position.

The feeding unit 4 is disposed in the openable unit 9. The feeding unit 4 is used to successively feed plural sheets SH along a feed path P1 to allow the reading unit 3 to read images of the sheets SH successively. As illustrated in FIGS. 2 and 6, the control unit C1 is accommodated in the recording unit 7. The control unit C1 is disposed below an outer surface of the main unit 8 facing to the left side and disposed along an outer surface of the recording unit 7 facing to the left side. The control unit C1 is electrically connected to the image forming unit 5, the reading unit 3, and the feeding unit 4 and controls them.

Figure 4:
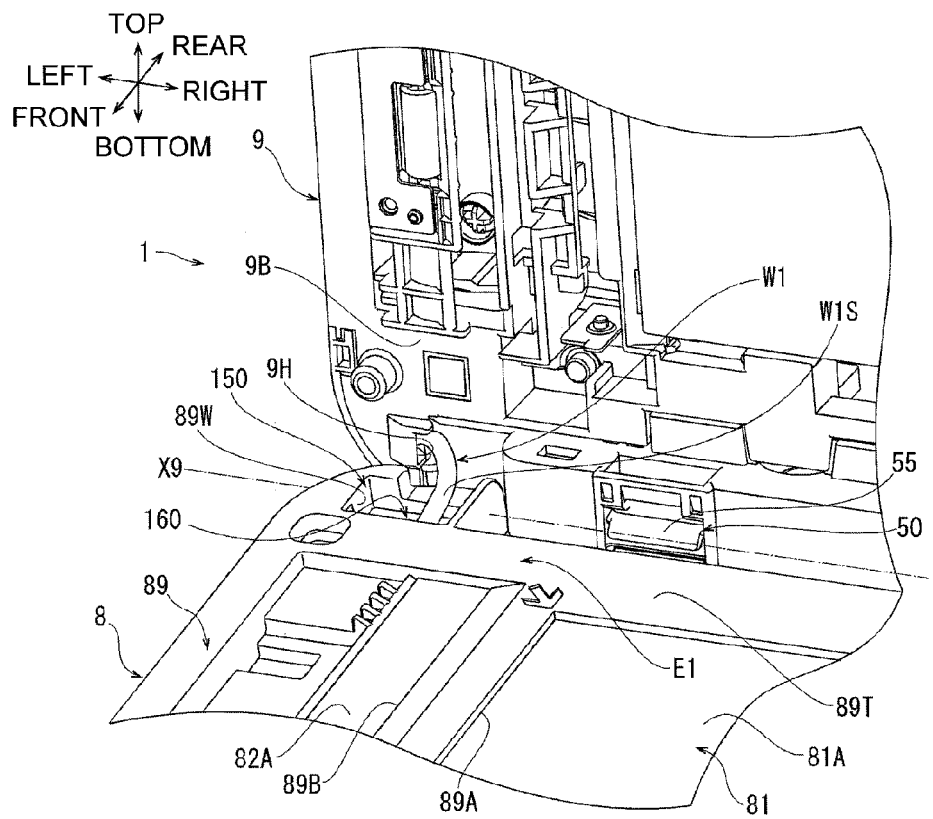
FIG. 4 is a partial perspective view illustrating an introduction portion and a cable with an openable unit in an open position.
Figure 7:
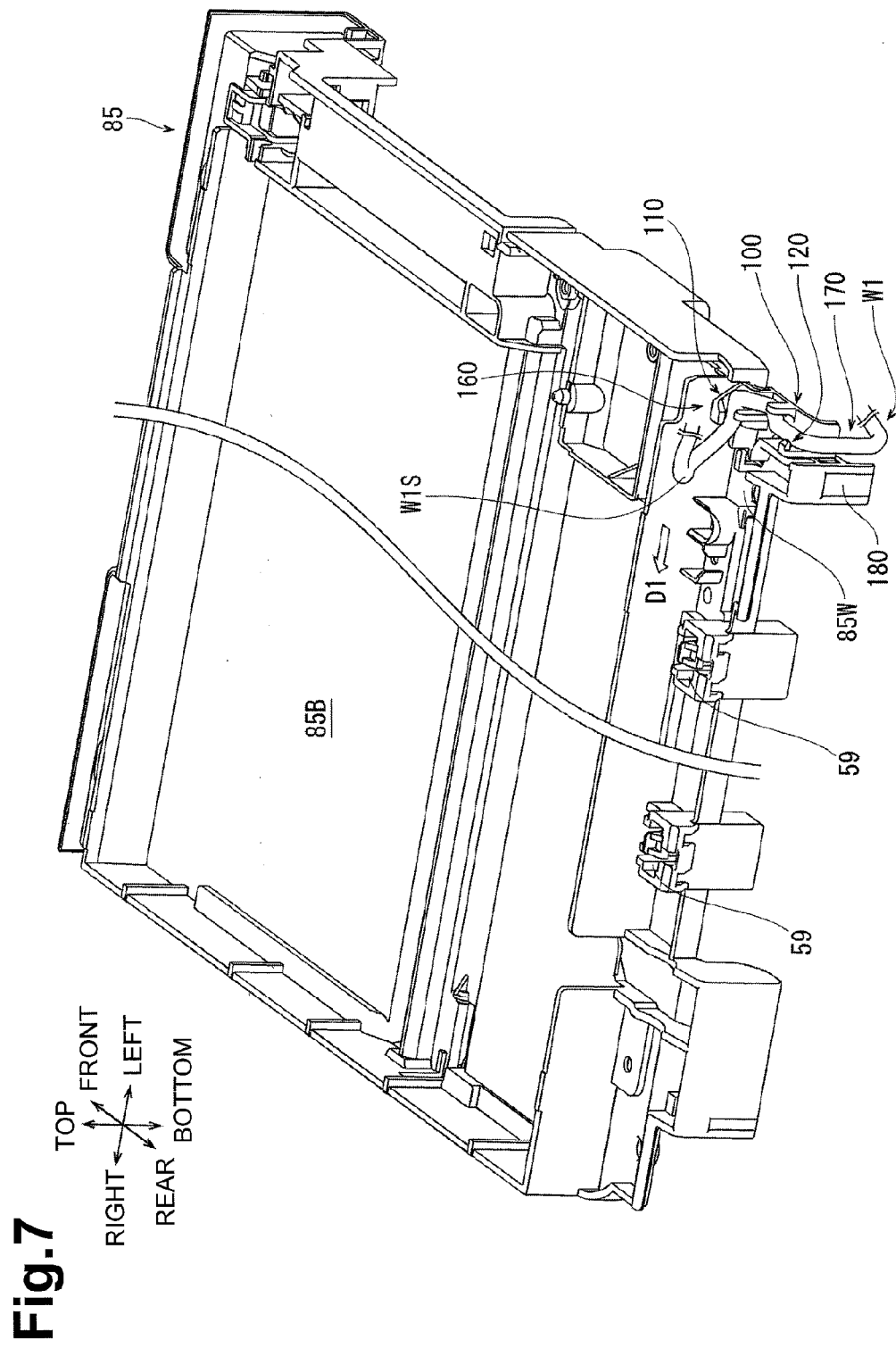
FIG. 7 is a partial perspective view illustrating a scanner base, a holding member, and a cable in the main unit.

As illustrated in FIGS. 2 and 4, a platen glass 81 is disposed on an upper surface of the main unit 8. The main unit 8 includes a scanner frame 89 illustrated in FIGS. 4-6 and a scanner base 85 illustrated in FIGS. 6 and 7. The scanner frame 89 and the scanner base 85 are made of resin. The scanner frame 89 holds the platen glass 81 around edges thereof. The scanner base 85 is shaped like a shallow box which is open upward. The platen glass 81 is held on the upper surface of the main unit 8 by combination of the scanner frame 89 and the scanner base 85.

As partially illustrated in FIG. 4, the scanner frame 89 has a first opening 89A and a second opening 89B. The first opening 89A has a shape of rectangle covering a large area extending in the front-rear direction and the left-right direction. The second opening 89B is located to the left of the first opening 89A. The second opening 89B has a shape of narrow rectangle extending longer in the front-rear direction and shorter in the left-right direction.

The upper surface of the platen glass 81 exposed from the first opening 89A constitutes a document support surface 81A. The document support surface 81A supports a document from below when the reading unit 3 reads an image of the document at rest. Documents to be read include a sheet of paper, a transparency, and a paper book.

The upper surface of the platen glass 81 exposed from the second opening 89B constitutes a read surface 82A. The read surface 82A guides, from below, a sheet SH fed singly by the feeding unit 4 when the reading unit 3 reads an image of the sheet SH fed singly by the feeding unit 4.

As illustrated in FIGS. 1 and 3-6, the openable unit 9 is coupled to the main unit 8 such that it is pivotable about an axis X9 and movable up and down relative to the main unit 8. More specifically, as illustrated in FIGS. 3-6, left and right hinges 50 are disposed between the main unit 8 and the openable unit 9. The hinges 50 are made of resin and each include an attachment portion 55 and a linear motion portion 51, which are united as one piece. The attachment portion 55 supports a shaft portion (not illustrated) disposed in the openable unit 9 such that the hinge 50 pivots about the axis X9. The axis X9 extends in the left-right direction on the rear side of the main unit 8. The linear motion portion 51 connects a lower surface of the attachment portion 55 and is shaped like a prism extending downward.

Figure 5:
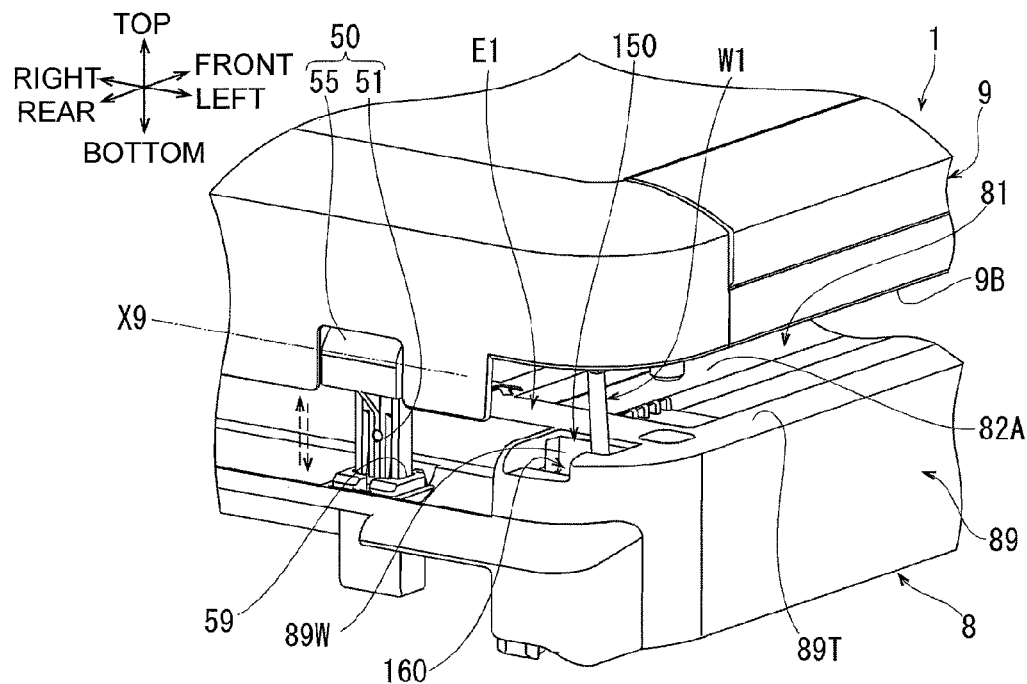
FIG. 5 is a partial perspective view illustrating the introduction portion and the cable with the openable unit being elevated from the closed position.

As illustrated in FIGS. 3 and 5-7, the main unit 8 includes two, left and right, accommodating portions 59. The accommodating portions 59 are recessed downward from two left and right positions on the rear end of the scanner base 85. The left and right linear motion portions 51 are inserted in the left and right accommodating portions 59 movably up and down. As illustrated in FIGS. 5 and 6, as the liner motion portion 51 moves up and down within the accommodating portion 59, the attachment portion 55 and the axis X9 moves up and down.

Figure 3:
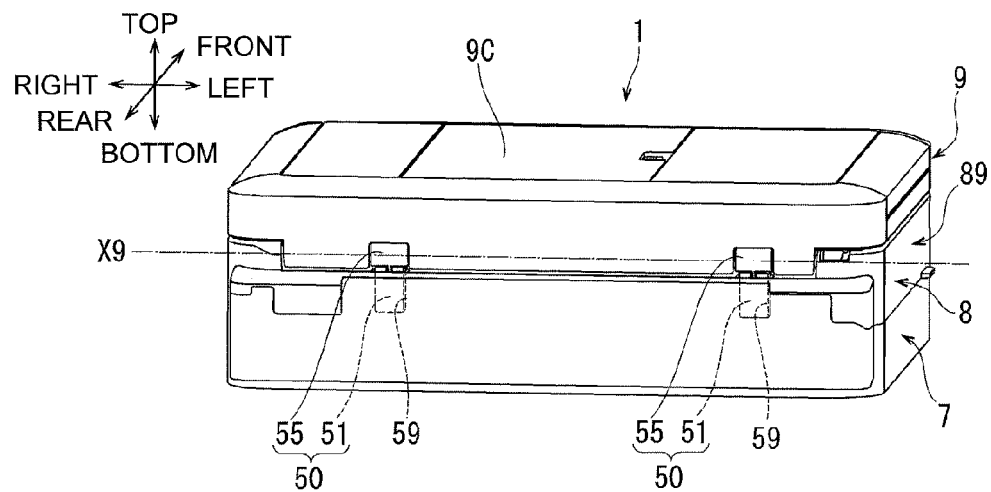
FIG. 3 is a perspective view of the image reading apparatus when viewed from a rear side.

As indicated by a solid line of FIG. 1, the openable unit 9 covers the document support surface 81A from above when the openable unit 9 is in a closed position. The position of the openable unit 9 indicated by the solid line in FIG. 1 is regarded as the closed position. FIGS. 2 and 3 also illustrate the openable unit 9 located in the closed position.

As indicated by a dash-dot-dot line in FIG. 1, the openable unit 9 exposes the document support surface 81A when the openable unit 9 pivots about the axis 9 so that its front end moves upward and rearward. The user can put a document to be read on the document support surface 81A. When the openable unit 9 exposes the document support surface 81A, the position of the openable unit 9 is regarded as a released position regardless of an angle of inclination of the openable unit 9 relative to the main unit 8. The position of the openable unit 9 indicated by the dash-dot-dot line in FIG. 1 is an example of the released position. FIG. 4 also illustrates the openable unit 9 located in the released position.

As illustrated in FIGS. 1-3, the openable unit 9 covers a document to be read from above by moving to the closed position with the document supported by the document support surface 81A. As illustrated in FIGS. 5 and 6, if a document to be read is a thick paper book, the openable unit 9 pivots toward the closed position with the linear motion portions 51 of the hinges 50 in elevated positions within the accommodating portions 59 and covers the thick document from above near the closed position.

As illustrated in FIG. 2, the reading unit 3 includes a read sensor 3S and a scanning mechanism not illustrated. The read sensor 3S is an example of a reader. The read sensor 3S and the scanning mechanism, not illustrated, are accommodated in a space defined by the scanner frame 89, the scanner base 85, and the platen glass 81, which are made up of the main unit 8. The scanning mechanism moves the read sensor 3S to reciprocate in the left-right direction under the document support surface 81A and the read surface 82A in the main unit 8. A position of the read sensor 3S stopping below the read surface 82A is a stationary reading position. The read sensor 3S is a known image-reading sensor such as a contact image sensor (CIS) and a charge-coupled device (CCD).

As illustrated in FIG. 2, the feeding unit 4 is disposed in the openable unit 9. The feeding unit 4 includes a supply portion 91, an ejection portion 92, a motor 4M, a sensor 4S, a wire harness W1 and a feed roller, not illustrated. The wire harness W1 is an example of a cable. The motor 4M and the sensor 4S are an example of an electric component.

The supply portion 91 and the ejection portion 92 are formed on a right portion of the openable unit 9 when a cover 9C is spread from a state illustrated in FIG. 1 to a state illustrated in FIG. 2. The ejection portion 92 is disposed above the supply portion 91.

The motor 4M generates a drive force required to rotate the feed roller (not illustrated) to feed a sheet SH along a feed path P1. The sensor 4S detects whether a sheet SH is present at a specified position.

The wire harness W1 is a wiring harness into which plural coated electric wires are bound together. One end W1A of the wire harness W1 is connected to the motor 4M and the sensor 4S. As illustrated in FIGS. 2 and 6, the other end W1B of the wire harness W1 is taken out of the openable unit 9, inserted into the main unit 8, and is connected to the control unit C1 disposed in the recording unit 7.

The supply portion 91 supports, from below, a sheet SH, which is to be read and fed by the feeding unit 4. When the motor 4M and the sensor 4S operate under control of the control unit C1, the feeding unit 4 separates a sheet SH one by one from a stack of sheets SH supported by the supply portion 91, and feeds the sheets SH successively along the feed path P1 toward the reading unit 3 where images of the sheets SH are read. The sheets SH whose images are read by the reading unit 3 are ejected to the ejection portion 92.

Image reading operation will be described.

In the image reading apparatus 1, when an image of a document supported on the document support surface 81A is read, the scanning mechanism (not illustrated) of the reading unit 3 starts to move the read sensor 3S in the left to right direction from a position below the left end of the document support surface 81A to a position below the right end thereof. Along with this movement, the read sensor 3S reads an image of a document supported on the document support surface 81A. Then, the scanning mechanism (not illustrated) moves the read sensor 3S, which have finished reading, from the right end to the left end to return the read sensor 3S to its original position.

In the image reading apparatus 1, when an image of a sheet SH on the supply portion 91 is read, the scanning mechanism (not illustrated) of the reading unit 3 stops the read sensor 3S at the stationary reading position under the read surface 82A. When the feeding unit 4 feeds sheets SH on the support portion 91 along the feed path P1 successively, each of the sheets SH passes through above the read sensor 3S positioned at the stationary reading position while contacting the read surface 82A. The read sensor 3S reads an image of each of the sheets SH passing through above the read sensor 3S. The feeding unit 4 feeds the sheets SH whose images have been read successively toward the ejection portion 92 such that the sheets SH are sequentially ejected and inserted under a stack of already-ejected sheets on the ejection portion 92.

The following will describe structures of the wiring harness, the introduction portion, the accommodation portion and the holding member and assembly process.

In the image reading apparatus 1, the wire harness W1 is taken out of the openable unit 9, inserted into the main unit 8 and connected to the control unit C1 as follows.

As illustrated in FIG. 4, the wire harness W1 is taken out from an exit opening 9H in a bottom wall 9B of the openable unit 9. The exit opening 9H is disposed in proximity to both of the axis X9 and an outer surface of the openable unit 9 facing to the left side. The exit opening 9H is open in the right direction from the outer surface of the openable unit 9 facing to the left side toward a central portion of the openable unit 9.

As illustrated in FIGS. 4-13, the main unit 8 includes an introduction portion 150, an accommodation portion 160, and a holding member 100.

As illustrated in FIGS. 4 and 5, the scanner frame 89 surrounding the edges of the document support surface 81A has an adjacent area E1, which is adjacent to the document support surface 81A from the axis X9. The introduction portion 150 is disposed in the adjacent area E1.

More specifically, the upper surface of the scanner frame 89, which surrounds the document support surface 81A, faces the bottom surface of the openable unit 9 located in closed position, and is thus referred to as a facing surface 89T. An opening formed around a rear left corner of the facing surface 89T is the introduction portion 150. Inner walls 89W extending downward from edges of the introduction portion 150 define a downward recess forming a substantially prism-shaped space. The space defined by the inner walls 89W is the accommodation portion 160, which will be described later. The accommodation portion 160 is disposed in the main unit 8.

Figure 10:
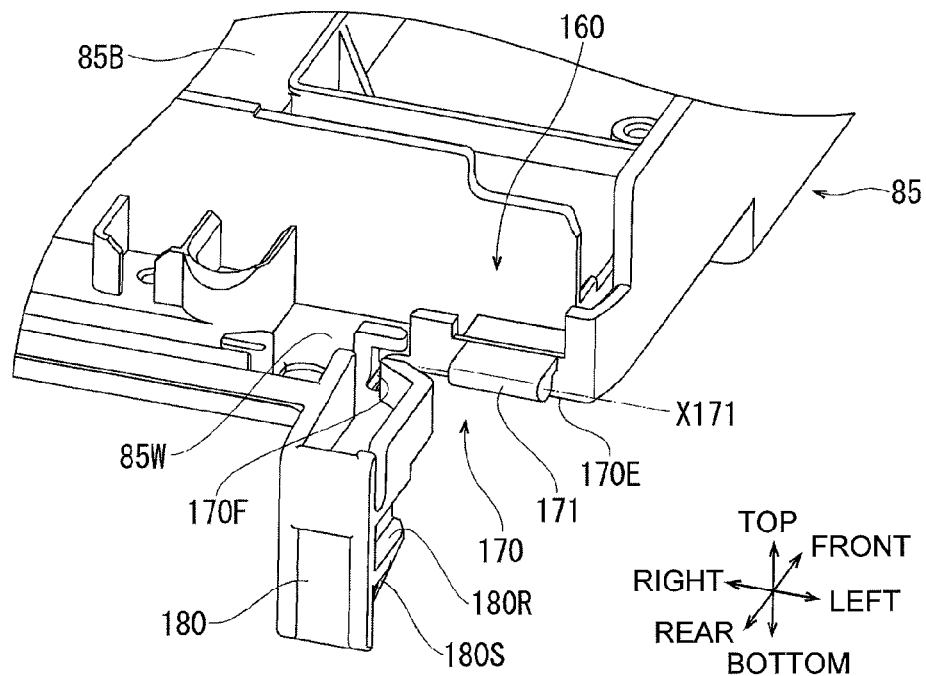
FIG. 10 is a partial perspective view with the holding member and the cable being removed from those illustrated in FIG. 8.
Figure 11:
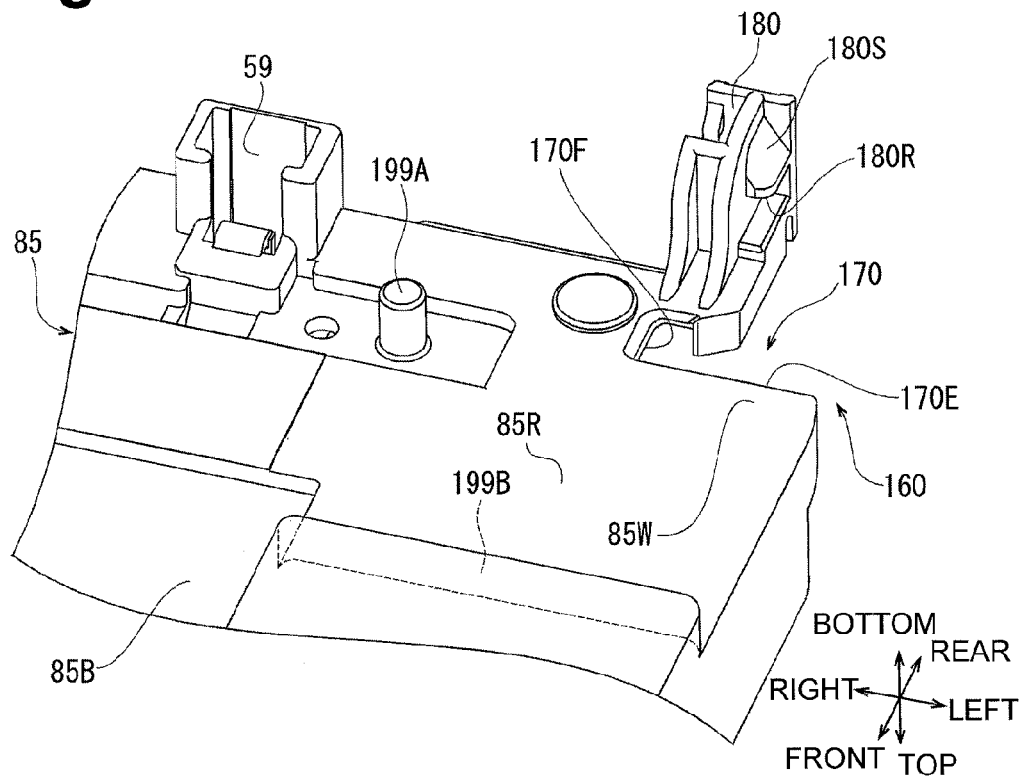
FIG. 11 is a partial perspective view with the holding member and the cable being removed from those illustrated in FIG. 9.

As illustrated in FIGS. 10 and 11, the scanner base 85 faces the document support surface 81A from below and has a bottom wall 85B extending in the front-rear direction and the left-right direction. The scanner base 85 has an inner wall 85W at a rear left corner of the bottom wall 85B, and the inner wall 85W is disposed under the inner walls 89W of the scanner frame 89.

As illustrated in FIGS. 6-11, the inner wall 85W of the scanner base 85 includes an opening 170 in a position opposite to the introduction portion 150. The opening 170 is a space formed in the inner wall 85 by cutting a corner of the inner wall 85W. The opening 170 and the introduction portion 150 communicate with each other vertically. Specifically, the inner walls 89 extending downward from the introduction portion 150 form the accommodation portion 160, and the accommodation portion 160 defines a passage where the introduction portion 150 communicates with the opening 170.

As illustrated in FIG. 10, a first engaging portion 171 is formed on an edge 170E defining a front part of the opening 170 and extending in the left-right direction. The first engaging portion 171 has a substantially cylindrical portion, which extends in the left-right direction at a position spaced from the edge 170E to the rear and defines an axis X171, and a connection portion, which has a plate-like shape and connects the cylindrical portion and the edge 170E.

The opening 170 is located closer to an outer surface of the main unit 8 facing to the left. As illustrated in FIG. 6, the opening 170 is located above and to the rear of the control unit C1, which is disposed closer to an outer surface of the recording unit 7 facing to the left. In other words, the control unit C1 is spaced apart from the opening 170 in the front-rear direction substantially orthogonal to the axis X171. The front-rear direction substantially orthogonal to the axis X171 is an example of a first direction of the disclosure.

As illustrated in FIGS. 10 and 11, a deformable portion 180 is formed on an edge 170F defining the opening 170, which is connected to a right end of the edge 170E and extends to the rear. The deformable portion 180 is spaced from the first engaging portion 171 to the rear. The deformable portion 180 protrudes from the edge 170F to the left and the rear and further to the bottom. As illustrated in FIG. 11, a left surface of the deformable portion 180 has an inclined surface 180S and an engaging portion 180R. The engaging portion 180R is recessed to the right above the inclined surface 180S. The deformable portion 180 is deformable in the left-right direction substantially parallel to the axis X171 as a portion of the deformable portion 180 connected to the edge 170F narrows. The left-right direction substantially parallel to the axis X171 is an example of a second direction of the disclosure.

As illustrated in FIGS. 8, 9, 12, and 13, the holding member 100 is made of resin and attachable to the opening 170. In the following description about the structure of the holding member 100, the front-rear direction, the left-right direction, and the vertical direction are used based on that the holding member 100 is attached to the opening 170.

Figure 12:
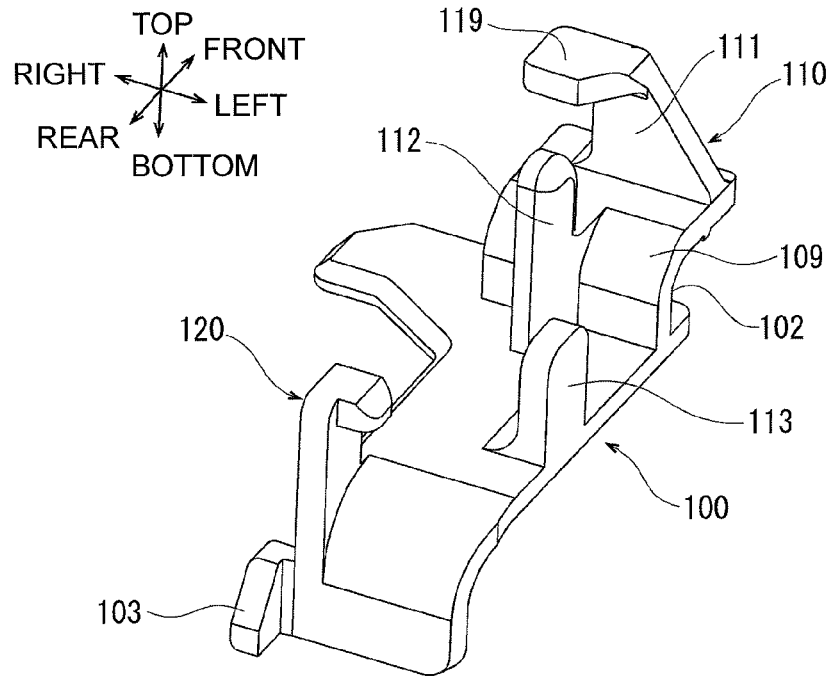
FIG. 12 is a perspective view of the holding member.
Figure 13:
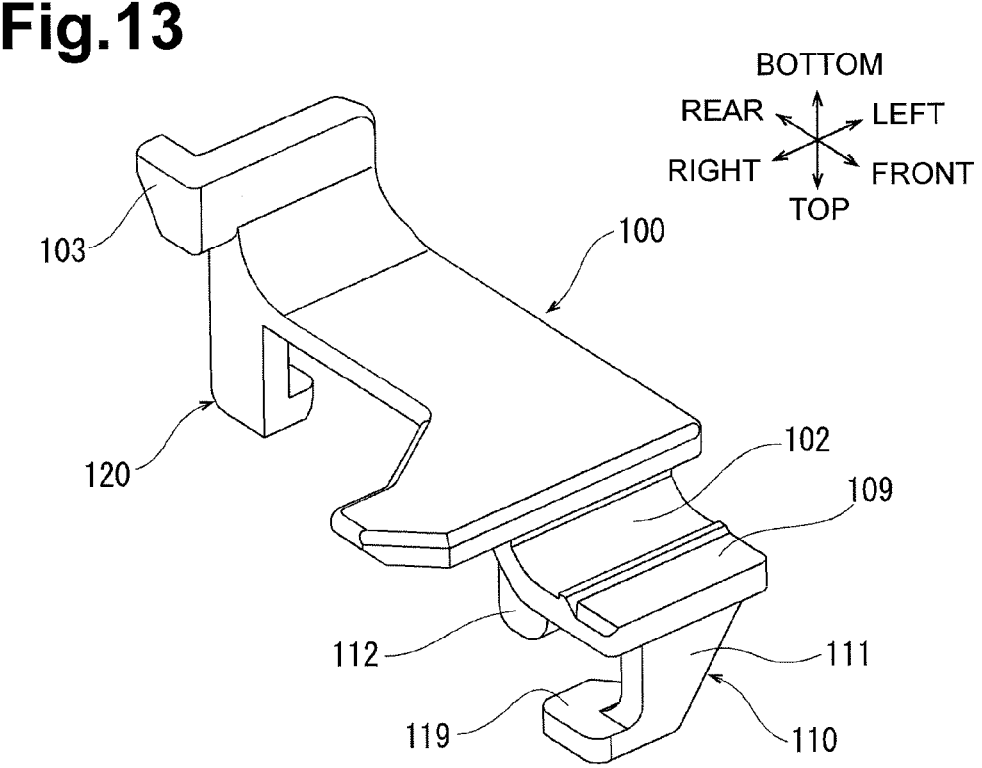
FIG. 13 is a perspective view of the holding member.

As illustrated in FIGS. 12 and 13, the holding member 100 has a shape based on an elongated flat plate extending in the front-rear direction. A front end portion of the holding member 100 includes a protruding portion 109. The protruding portion 109 protrudes upward from the front end portion of the holding member 100 and extends to the front in a curved manner. A rear end portion of the holding member 100 is curved downward.

The holding member 100 includes a second engaging portion 102 and a third engaging portion 103. The second engaging portion 102 is a recessed portion, which is recessed to the rear between the front end portion of the holding member 100 and the protruding portion 109 and extends in the left-right direction. The third engaging portion 103 is a protrusion protruding rearward from a right corner at the rear end portion of the holding member 100.

Figure 8:
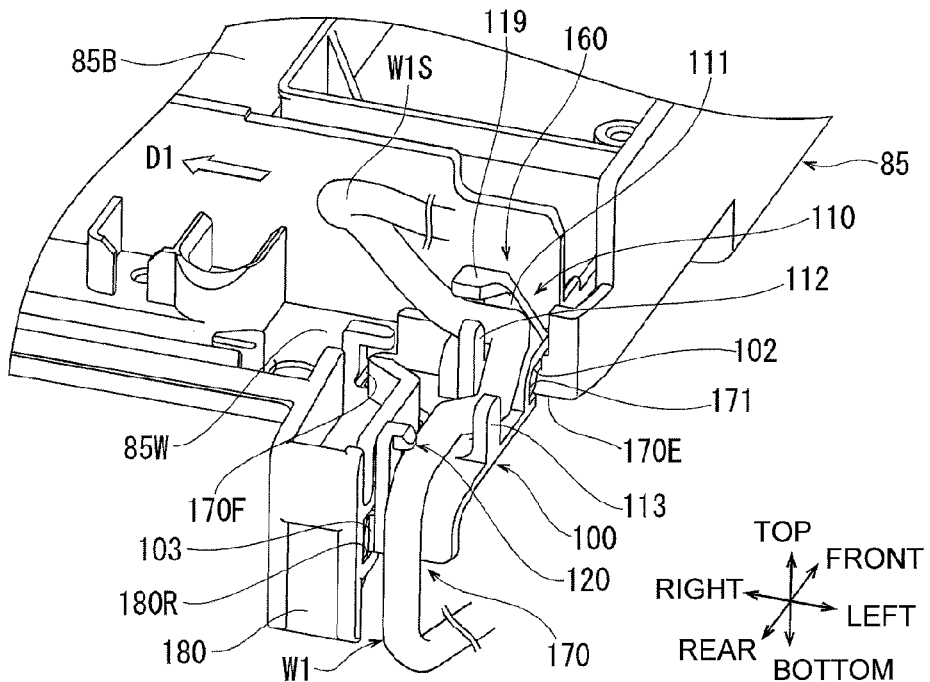
FIG. 8 is a partial perspective view illustrating the scanner base, the holding member, and the cable in the main unit.
Figure 9:
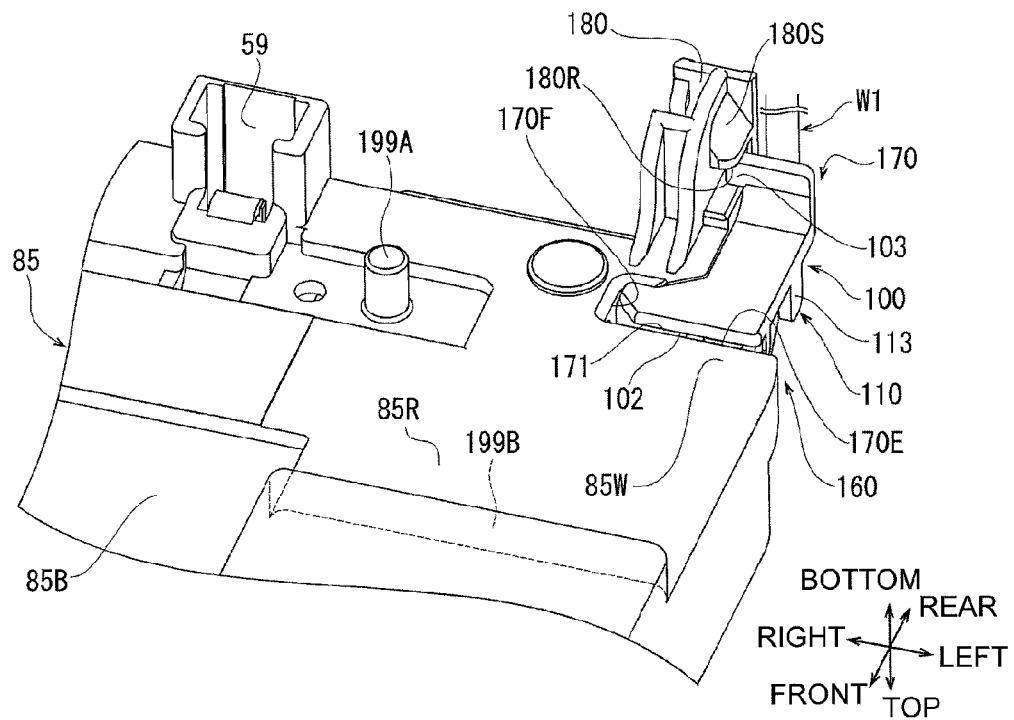
FIG. 9 is a partial perspective view illustrating the scanner base, the holding member, and the cable in the main unit.
Figure 18:
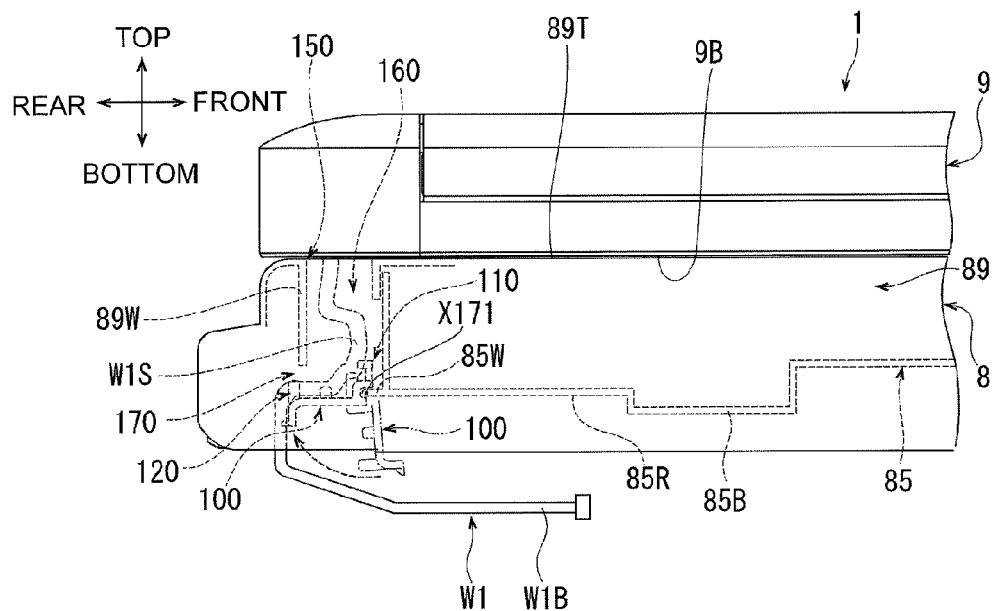
FIG. 18 is a partial side view illustrating a third process.

As illustrated in FIGS. 8 and 9, the second engaging portion 102 is engageable with the first engaging portion 171. The third engaging portion 103 is engageable with the engaging portion 180R of the deformable portion 180. As illustrated in FIG. 18, the holding member 100 is pivotable about the axis X171 in a state where the second engaging portion 102 engages the first engaging portion 171. The holding member 100 is attached to the opening 170 by pivoting about the axis X171 from a position indicated by a dash-dot-dot line in FIG. 18 to a position closer to the opening 170 indicated by a broken line. While the holding member 100 pivots about the axis X171 in a direction toward the opening 170, the third engaging portion 103 slides on the inclined surface 180S of the deformable portion 180 and the deformable portion 180 is elastically deformed to the right. As illustrated in FIGS. 8 and 9, when the holding member 100 pivots up to a position where the holding member 100 is attached to the opening 170, the third engaging portion 103 separates from the inclined surface 180S and engages the engaging portion 180R, and thus the deformable portion 180 returns to its original position. As the holding member 100 is prevented from pivoting oppositely or in a direction away from the opening 170 by the deformable portion 180 at its original position, the holding member 100 is inseparable from the opening 170. The holding member 100 can be removed from the opening 170 even when the user directly deforms the deformable portion 180 to disengage the third engaging portion 103 from the engaging portion 180.

As illustrated in FIGS. 12 and 13, the holding member 100 includes a first guide portion 110 and a second guide portion 120.

The first guide portion 110 includes protrusions 111, 112, and 113 protruding from the holding member 100. The protrusion 111 protrudes upward from an upper surface of a portion of the protruding portion 109 extending to the front, extends in the left-right direction, and has a plate-like shape. A restriction portion 119 is formed at an upper end portion of the protrusion 111. The restriction portion 119 protrudes from the upper end portion of the protrusion 111 to the right and rear, and has a plate-like shape. The protrusion 112 is connected to a portion of the protruding portion 109 extending upward, protrudes upward, and has a prism-like shape. The protrusion 113 is disposed adjacent to the left edge of the holding member 100 and further to the rear than the protrusion 112, protrudes upward and has a prism-like shape.

The second guide portion 120 protrudes upward from a right corner in a rear end portion of the holding member 100 and has a prism-like shape. An upper end portion of the second guide portion 120 is bent to the left. As illustrated in FIGS. 6 and 8, the second guide portion 120 is spaced from the second engaging portion 102 and the control unit C1 to the rear in a state where the holding member 100 is attached to the opening 170.

As illustrated in FIG. 4, the wire harness W1 pulled out from the exit opening 9H of the openable unit 9 is led in the introduction portion 150. As illustrated in FIG. 8, the holding member 100 attached to the opening 170 holds the wire harness W1 while producing slack W1S in the wire harness W1 such that the wire harness W1 can follow the pivoting and up-and-down movements of the openable unit 9. More specifically, a portion of the wire harness W1 located below the slack W1S is held in the front-rear direction by the protrusions 111 and 112 of the first guide portion 110 and vertically by the protruding portion 109 and the restriction portion 119. The restriction portion 119 restricts the wire harness W1 from moving up toward the openable unit 9. The wire harness W1 is bent at the protrusion 112 to the rear and a portion of the wire harness W1 extending from the protrusion 112 to the rear is held in the left-right direction by the protrusions 112 and 113 of the first guide portion 110.

In this way, the first guide portion 110 reliably holds the portion of the wire harness W1 located below the slack W1S. The first guide portion 110 guides the slack W1S in the wire harness W1 in a direction D1 within the introduction portion 150. The direction D1 is a direction substantially parallel to the axis X9 and directing from the outer surface of the main unit 8 facing to the left toward a central portion of the main unit 8.

As illustrated in FIGS. 6-9, the second guide portion 120 holds the wire harness W1 in cooperation with a rear end portion of the holding member 100 curved downward and changes the orientation of the wire harness W1 to downward. The wire harness W1 inserted into the accommodation portion 160 from the introduction portion 150 is pulled out from the opening 170 and guided toward the control unit C1.

Figure 14:
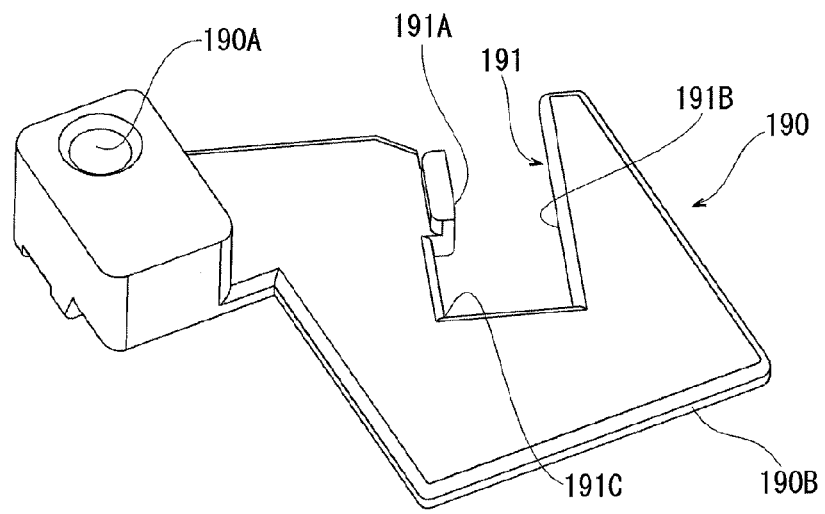
FIG. 14 is a perspective view of a jig.

Next, description will be made as to assembly process for accurately producing the slack W1S in the wire harness W1, which is led in from the introduction portion 150, within the accommodation portion 160. In a manufacturing method of the image reading apparatus 1 according to the embodiment, a jig illustrated in FIG. 14 is used. The manufacturing method is implemented with the openable unit 9 being coupled to the main unit 8 and in a step prior to where the main unit 8 is assembled to the recording unit 7. The manufacturing method includes first, second, and third processes illustrated in FIGS. 15-18.

As illustrated in FIG. 14, the jig 190 has a reference hole 190A, a reference edge 190B and a positioning portion 191. The jig 190 is made of a material, such as resin and metal, which has stability to produce the required dimensional accuracy. As illustrated in FIG. 11, an underside 85R of the bottom surface 85B of the scanner base 85 includes a boss 199A and a stepped portion 199B.

<First Process>

Figure 15:
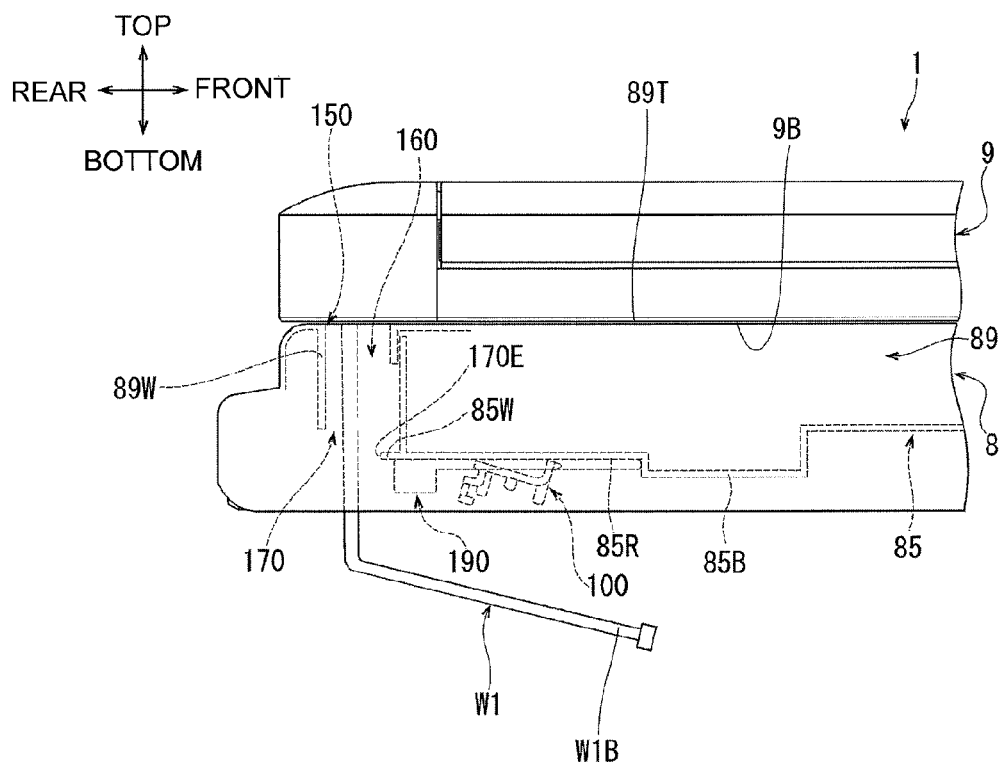
FIG. 15 is a partial bottom view illustrating a first process.

As illustrated in FIG. 15, in a first process, the openable unit 9 coupled to the main unit 8 is maintained in the closed position. In other words, without a document on the document support surface 81A, the bottom surface 9B of the openable unit 9 contacts the document support surface 81A and the facing surface 89T of the main unit 8. With this state, relative positional relationship between the openable unit 9 and the main unit 8 remains unchanged.

Figure 16:
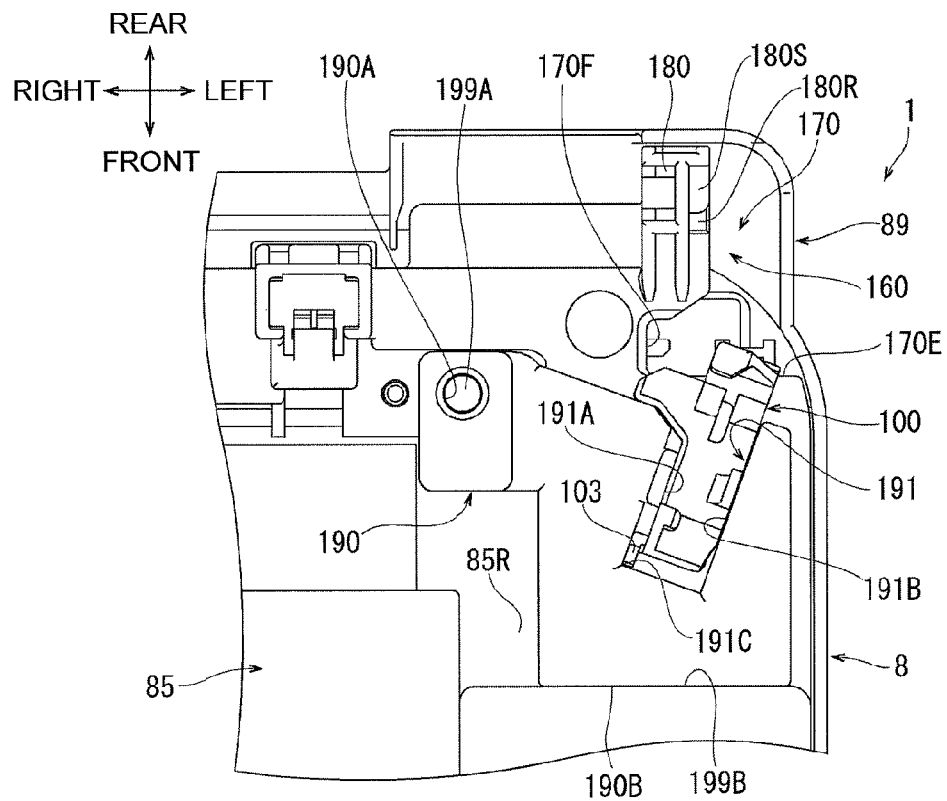
FIG. 16 is a partial bottom view illustrating the first process.

As illustrated in FIGS. 15 and 16, the jig 190 is attached to the underside 85R of the bottom surface 85B of the scanner base 85. At this time, the boss 199A protruding from the underside 85R of the bottom surface 85B is inserted into the reference hole 190A of the jig 190, and the reference edge 190B of the jig 190 is brought into contact with the stepped portion 199B of the scanner base 85. Thus, as illustrated in FIG. 16, the jig 190 is positioned accurately relative to the scanner base 85. When the jig 190 is attached to the scanner base 85, the positioning portion 191 is located at a position spaced apart from the opening 170. A distance with which the positioning portion 191 is spaced apart from the opening 170 may be changed appropriately according to a length of the slack W1S required in the wire harness W1. For example, the length of the slack W1S is determined such that, when the openable unit 9 is maximally raised relative to the main unit 8, the wire harness W1 does not become taut or loose undesirably.

As illustrated in FIGS. 15 and 16, the holding member 100 is fit in the positioning portion 191 of the jig 190. At this time, the third engaging portion 103 of the holding member 100 is pressed against an inside corner 191C of the positioning portion 191, and the holding member 100 is held by opposite edges 191A and 191B of the positioning portion 191. Thus, as illustrated in FIG. 16, the holding member 100 is positioned accurately relative to the jig 190.

Namely, in the first process, the jig 190 is disposed between the holding member 10 and the scanner base 85 in a state where the openable unit 9 is located in the closed position, and then the holding member 100 is positioned relative to the scanner base 85 at a position (a first position) where the holding member 100 is spaced apart from the opening 170. In other words, the holding member 100 is attached in the first position to the main unit 8.

<Second Process>

Figure 17:
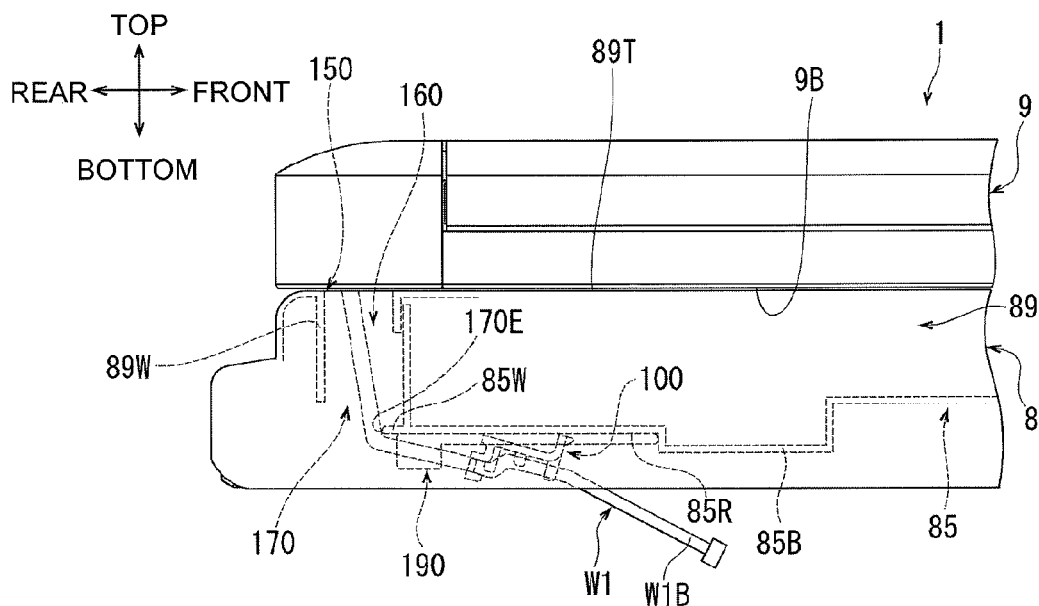
FIG. 17 is a partial side view illustrating a second process.

As illustrated in FIG. 17, in a second process, the wire harness W1 is put in the holding member 100 positioned relative to the scanner base 85 with the jig 190 therebetween. In this state, the wire harness W1, which is pulled out from the exit opening 9H of the openable unit 9, extends downward straightly and is bent by contact with the edge 170E of the opening 170. Then, the wire harness W1 extends frontward straightly, and is held by the first guide portion 110 and the second guide portion 120 of the holding member 100. In other words, the first guide portion 110 and the second guide portion 120 hold a first specified portion of the wire harness W1.

Although illustration is omitted, the jig 190 is removed from the scanner base 85 after the holding member 100 holding the specified portion of the wire harness W1 is separated from the positioning portion 191 of the jig 190.

<Third Process>

As illustrated in FIG. 18, in a third process, the holding member 100 holding the wire harness W1 is attached to the opening 170. Namely, the holding member 100 is attached to the main unit 8 at a second position away from the first position. At this time, the second engaging portion 102 of the holding member 100 is engaged with the first engaging portion 171 of the opening 170, and the holding member 100 is pivoted about the axis X171 from a position indicated by the dash-dot-dot line in FIG. 18 to the second position indicated by the broken line in FIG. 18. The holding member 100, which was spaced apart from the opening 170 in the second process, is attached to the opening 170, and thereby the slack W1S is produced in a second specified portion of the wire harness W1, which was extending straightly in the second process from the introduction portion 150 to the opening 170. In other words, by moving the holding member 100 to a position where the holding member 100 is attached to the opening 170, the second specified portion of the wire harness W1, which was extending straightly from the introduction portion 150 to the opening 170, forms the slack W1S.

When the third process is complete, the main unit 8 is assembled to the recording unit 7 as illustrated in FIG. 6, and the other end W1B of the wire harness W1 is electrically connected to the control unit C1.

As illustrated in FIGS. 4, 6, and 18, the slack W1S of the wire harness W1 is accommodated in the main unit 8, and is not exposed toward the rear side of the main unit 8. Thus, with this configuration, the wire harness W1 does not detract from the appearance of the image reading apparatus 1.

As illustrated in FIGS. 8-11, the wire harness W1 pulled out from the opening unit 9 is inserted into the introduction portion 150 and the accommodation portion 160 and is pulled out from the opening 170. The holding member 100 is attached, from the underside 85R of the bottom wall 85B of the scanner base 85, to the opening 170 facing the introduction portion 150 from below and being formed in the inner wall 85W constituting a part of the bottom wall 85B. Thus, in the assembly processes illustrated in FIGS. 15-18, when the openable unit 9 is located in the closed position, the wire harness W1 is held by the holding member 100 and then the holding member 100 is attached to the opening 170. At this time, as the openable unit 9 is located in the closed position, relative positional relationship between a portion of the wire harness W1 pulled out from the openable unit 9 and the main unit 8 remains unchanged, and a degree of the slack W1S in the wire harness W1 to be inserted into the introduction portion 150 and produced within the accommodation portion 160 can be easily and accurately adjusted. Thus, there is little likelihood of causing a problem related to the degree of the slack W1S, which is too small or too large. As illustrated in FIG. 8, when the holding member 100 is attached to the opening 170, the first guide portion 110 of the holding member 100 guides, in the direction D1, the slack W1S of the wire harness W1 within the accommodation portion 160 of the main unit 8. As illustrated in FIGS. 6 and 18, the degree of the slack W1S only changes within the accommodation portion 160 in response to the pivoting and up-and-down movements of the openable unit 9. Thus, the image reading apparatus 1 has a low probability of occurrence of problems caused by insufficient or excessive degree of the slack W1S. If the slack W1S is too small, the wire harness W1 having extended to its full length may hinder the openable unit 9 from pivoting and moving up and down, and if the slack W1S is too large, the wire harness W1 may get caught between the openable unit 9 and the main unit 8. In addition, as the first guide portion 110 guides the wire harness W1 in the direction D1 within the accommodation portion 160, occurrence of a kink or bend in the wire harness W1 can be reduced.

Thus, the image reading apparatus 1 allows the wire harness W1 to follow the pivoting and up-and-down movements of the openable unit 9 reliably, while achieving improved quality of appearance.

In the image reading apparatus 1, the opening 170 is formed in the inner wall 85W, which is spaced downward from the facing surface 89T, and is disposed at the position facing the introduction portion 150. The holding member 100 is attached to the opening 170. Thus, a vertical length or height of the accommodation portion 160 can be fully kept and the slack W1S in the wire harness W1 can be easily accommodated in the accommodation portion 160 of the main unit 8. Furthermore, the opening 170 and the introduction portion 150 communicate with each other vertically. When the openable unit 9 is located in the closed position, the holding member 100 can be easily attached to the opening 170 from a side opposite to the facing surface 89T of the main unit 8, that is, from the underside 85R of the bottom wall 85B of the scanner base 85.

As illustrated in FIGS. 8 and 18, the holding member 100 is attached to the opening 170 by engaging the second engaging portion 102 of the holding member 100 with the first engaging portion 171 formed at the edge 170E of the opening 170 and allowing the holding member 100 to pivot about the axis 171. In this manner, attaching of the holding member 100 to the opening 170 can be easily performed in the image reading apparatus 1.

As illustrated in FIGS. 6 and 8, the control unit C1 is spaced apart to the front from the opening 170. The second guide portion 120 of the holding member 100, which is attached to the opening 170, is spaced apart to the rear from the second engaging portion 102 and the control unit C1. The deformable portion 180 formed at the edge 170F of the opening 170 is spaced apart to the rear from the first engaging portion 171 and is configured to elastically deform in the left-right direction substantially parallel to the axis S171. In the middle of pivoting about the axis X171, the holding member 100 contacts the deformable portion 180, and deforms the deformable portion 180 in the left-right direction. As illustrated in FIG. 9, when the holding member 100 pivots to the position where it is attached to the opening 170, the holding member 100 is restricted from pivoting in the opposite direction by the deformable portion 180 having returned to its original position, and the wire harness W1 is guided toward the control unit C1 by the second guide portion 120. With this configuration, when the wire harness W1 is guided to the control unit C1 by the second guide portion 120, it is pulled downward and frontward at the rear of the holding member 100. The holding member 100 is subjected to a force acting in a direction as to move a rear portion of the holding member 100 downward and frontward. The direction of the force acting on the holding member 100 is orthogonal to a direction in which the deformable portion 180 is deformed, that is, the left-right direction. Thus, even when the rear portion of the holding member 100 is pulled downward and frontward by the wire harness W1, the deformable portion 180

There is little likelihood that the holding member 100 will come off the opening 170. As the wire harness W1 is guided by the second guide portion 120, the second engaging portion 102 is pressed against the first engaging portion 171, and thus the play between the second engaging portion 102 and the first engaging portion 171 is reduced.

In the image reading apparatus 1, the axis X171 of the first engaging portion 171 is substantially parallel to the axis X9 of the openable unit 9. The opening 170 and the control unit C1 are disposed in proximate to the outer surface of the main unit 8 facing to the left side. With this configuration, routing of the wire harness W1 and attaching of the holding member 100 are performed near the outer surface of the main unit 8 facing to the left side. Limited space in proximity to the outer surface of the main unit 8 facing to the left can be used efficiently. In addition, there is little likelihood that the wire harness W1 and the holding member 100 will contact other components accommodated in the main unit 8.

In the image reading apparatus 1, the motor 4A and the sensor 4S are electric components and the plural coated electric wires, which are connected to the motor 4M and the sensor 4S, are bound together into the wire harness W1. The wire harness W1 can be easily bent and curved to produce slack. The direction D1 in which the wire harness W1 slackens is substantially parallel to the axis X9 and directs from the outer surface of the main unit 8 facing to the left side toward a central portion. Thus, the slack in wire harness W1 is orientated in a direction away from the outer surfaces of the main unit 8 and the openable unit 9 facing to the left side. As a result, when the openable unit 9 pivots or moves up and down, the wire harness W1 can be reliably reduced from getting caught between the main unit 8 and the openable unit 9.

In the image reading apparatus 1, the restriction portion 119 formed in the first guide portion 110 restricts the wire harness W1 form moving up toward the openable unit 9. Thus, the holding member 100 can reliably hold the wire harness W1.

According to the manufacturing method of the image reading apparatus 1, in the first process illustrated in FIGS. 15 and 16, as the openable unit 9 is located in the closed position, the portion of the wire harness W1 pulled out from the openable unit 9 is positioned relative to the main unit 8. Thus, in the first process, the portion of the wire harness W1 pulled out from the openable unit 9 is also positioned relative to the holding member 100, which is positioned relative to the main unit 8. In the second process illustrated in FIG. 17, the wire harness W1 devoid of the slack W1S is held by the holding member 100 positioned relative to the main unit 8, and thereby the first specified portion of the wire harness W1 can be accurately held by the first guide portion 110 of the holding member 100. In the third process illustrated in FIG. 18, the slack W1S is produced in the wire harness W1 by attaching the holding member 100 holding the wire harness W1 to the opening 170, and thereby the slack W1S produced in the wire harness W1 can be kept at a fixed length within the accommodation portion 160. As a result, the image reading apparatus 1 obtained by this manufacturing method has a low probability of occurrence of problems caused by insufficient or excessive degree of the slack W1S. If the slack W1S is too small, the wire harness W1 having extended to its full length may hinder the openable unit 9 from pivoting and moving up and down, and if the slack W1S is too large, the wire harness W1 may get caught between the openable unit 9 and the main unit 8.

In the image reading apparatus 1 obtained by this manufacturing method, the slack W1S in the wire harness W1 and the holding member 100 are not exposed to the rear of the main unit 8, in contrast to the related art described above.

Thus, according to the manufacturing method of the image reading apparatus 1, an improvement in the quality of external appearance has been achieved and the wire harness W1 can follow the pivoting and up-and-down movements of the openable unit 9.

According to the manufacturing method of the image reading apparatus 1, the degree of the slack W1S to be produced in the wire harness W1 can be easily adjusted by changing the jig 190. As the jig 190 has a shape required for holding an object in position, there is no need to shape the main unit 8 so as to hold an object in position, and thus the need for complicating the main unit 8 can be reduced.

The embodiment shows, but is not limited to, the wire harness W1. A wire harness may be replaced with, for example, a flexible flat cable that would be pulled out from a reading unit disposed in the openable unit or display unit. Similarly, the electronic components may be a reading unit disposed in the openable unit, a display, and others, which are unrelated to the feeding unit.

The embodiment shows, but is not limited to, that the control unit C1 being accommodated in the recording unit 7, which is disposed external to the openable unit 9 and the main unit 8. The disclosure may be applied to an apparatus in which the control unit is disposed in the main unit or outside of the openable unit. If the control unit is disposed in the main unit, a cable inserted via the introduction portion into the accommodation portion may be connected to the control unit disposed in the main unit.

The embodiment shows, but is not limited to, the deformable portion 180 disposed in the position described above. The deformable portion 180 may be located at other place on the edge 170F of the opening 170 or may be formed at the holding member 100. Alternatively, both of the holding member 100 and the edge 170F of the opening 170 may have a structure corresponding to the deformable portion 180. The direction in which the deformable portion 180 is deformed is not limited to the direction described above.

The embodiment shows, but is not limited to, that the introduction portion 150 and the opening 170 are disposed at positions opposite to each other. The introduction portion 150 and the opening 170 may deviate from each other within given design limits. The accommodation portion 160 is not essential. The accommodation portion 160 may have any shape that can accommodate slack W1S in the wire harness W1 without being limited to the arrangement of the inner walls 89W.

The embodiment shows, but is not limited to, that the holding member 100 is positioned relative to the main unit 8 with the jig 190 therebetween. In the first process, the holding member may be positioned relative to the main unit 8 directly without the use of the jig.

Figure 19:
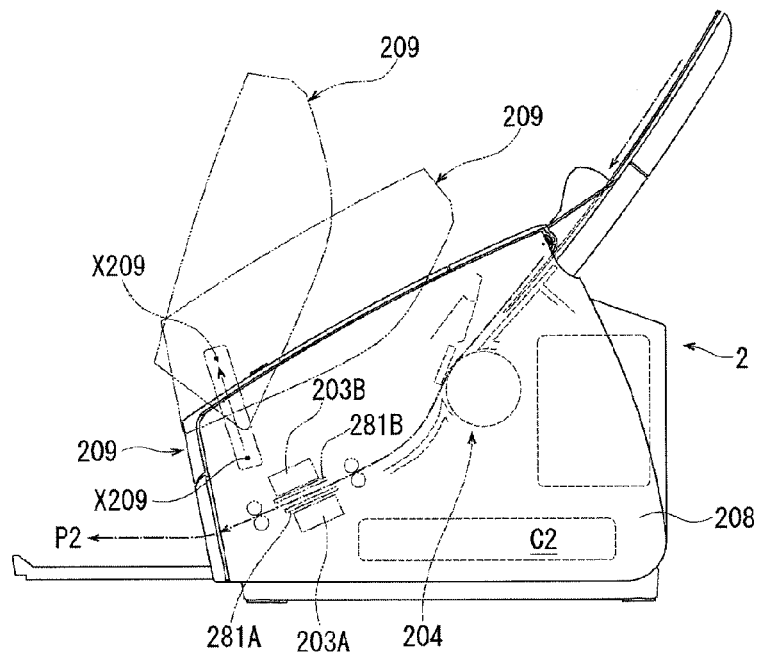
FIG. 19 is a side view in schematic form illustrating a document scanner as an example of an image reading apparatus of the disclosure.

The image reading apparatus of the disclosure may be embodied as a document scanner 2 illustrated in FIG. 19. The document scanner 2 includes a main unit 208, an openable unit 209, and a feeding unit 204. The openable unit 209 is coupled to the main unit 208 such that it is pivotable about an axis X209 and movable up and down relative to the main unit 208 as indicated by a dash-dot-dot line in FIG. 19. The feeding unit 204 feeds a sheet SH along a feed path P2.

The main unit 208 supports a platen glass 281A and accommodates a read sensor 203A below the platen glass 281A. The read sensor 203A faces the feed path P2 via the platen glass 281A from below. A control unit C2 is accommodated in the main unit 208.

The openable unit 209 supports a platen glass 281B and accommodates a read sensor 203B above the platen glass 281B. The read sensor 203B faces the feed path P2 via the platen glass 281B from above.

The document scanner 2 may also include a cable, an introduction portion, an accommodation portion, an opening, and a holding member, which are similar in structure to the wire harness W1, the introduction portion 150, the accommodation portion 160, the opening 170, and the holding member 100, respectively, according to the above embodiment. Even with the document scanner 2, it is clear that effects similar to those brought about by the image reading apparatus 1 described in the above embodiment can be appreciated.

While the features herein have been described in connection with various example structures and illustrative aspects, it will be understood by those skilled in the art that other variations and modifications of the structures and aspects described above may be made without departing from the scope of the inventions described herein. Other structures and aspects will be apparent to those skilled in the art from a consideration of the specification or practice of the features disclosed herein. It is intended that the specification and the described examples only are illustrative with the true scope of the inventions being defined by the following claims.

What is claimed is:

1. An image reading apparatus comprising:
    a main unit including:
        a facing surface including a document support surface configured to support a document on the document support surface; and
        a reading unit disposed in the main unit, the reading unit being configured to read an image of the document supported on the document support surface;
    an openable unit coupled to the main unit, the openable unit being configured to move up and down relative to the main unit and to pivot about an axis between a closed position where the document support surface of the main unit is covered and a released position where the document support surface of the main unit is exposed, the openable unit including:
        an electric component accommodated in the openable unit; and
        a feeding unit configured to feed a sheet along a feed path, the reading unit of the main unit being configured to read an image of the sheet fed along the feed path;
    a cable connected to the electric component of the openable unit and routed in the main unit; and
    a holding member attached to the main unit and configured to hold the cable routed in the main unit, the holding member including a first guide portion configured to guide the cable in a specified direction within the main unit and hold a first specified portion of the cable,
    wherein the holding member attached to the main unit, with the first guide portion holding the first specified portion of the cable, is configured to move from a first position to a second position,
    wherein, when the holding member is in the first position, the cable has no slack in a second specified portion of the cable, the second specified portion being closer to an end of the cable disposed in the openable unit than the first specified portion, and
    wherein, when the holding member is in the second position, the cable has slack in the second specified portion of the cable routed in the main unit.

2. The image reading apparatus according to claim 1, wherein the main unit further includes:
    an introduction portion disposed in an area adjacent to the document support surface, the introduction portion into which the cable extending from the openable unit is inserted; and
    a wall surface facing the document support surface and the facing surface in spaced relation to the document support surface and the facing surface, the wall surface having an opening through which the cable inserted into the introduction portion passes, the opening being located at a position corresponding to the introduction portion.

3. The image reading apparatus according to claim 2,
    wherein an edge defining the opening of the main unit includes a first engaging portion defining an axis,
    wherein the holding member includes a second engaging portion configured to engage the first engaging portion, and
    wherein the holding member is attached to the opening by engaging the second engaging portion and the first engaging portion and pivoting about the axis defined by the first engaging portion.

4. The image reading apparatus according to claim 3,
    wherein a deformable portion is formed on an edge defining the opening, and the deformable portion is deformable in a direction away from the edge defining the opening,
    wherein the holding member is configured to, in a process of which the holding member is attached to the opening by pivoting about the axis in a direction toward the opening, elastically deform the deformable portion, and
    wherein the deformable portion is configured to, when the holding member is attached to the opening, return to an original state of the deformable portion and prevent the holding member from pivoting about the axis in a direction away from the opening.

5. The image reading apparatus according to claim 4, wherein the holding member includes a second guide portion configured to guide the cable toward a control unit.

6. The image reading apparatus according to claim 5,
    wherein the control unit is spaced apart from the opening in a first direction substantially orthogonal to the axis of the holding member,
    wherein the second guide portion of the holding member attached to the opening is spaced apart from the second engaging portion and the control unit in the first direction, and
    wherein the deformable portion is deformable in a second direction substantially parallel to the axis of the holding member.

7. The image reading apparatus according to claim 4, wherein the deformable portion is spaced apart from the first engaging portion of the main unit in the first direction.

8. The image reading apparatus according to claim 3,
    wherein the axis of the holding member is substantially parallel to the axis of the openable unit, and
    wherein the opening and the control unit are disposed in proximity to an outer surface of the main unit facing in a direction of the axis of the openable unit.

9. The image reading apparatus according to claim 1,
    wherein the electronic component includes at least one of a motor configured to generate a drive force to convey a sheet and a sensor for detecting a sheet,
    wherein the cable includes a wire harness in which a plurality of coated wires are bound, and
    wherein the specified direction is substantially parallel to the axis of the openable unit and is directed from an outer surface of the main unit in a direction of the axis of the openable unit toward a central portion of the main unit.

10. The image reading apparatus according to claim 1, wherein the first guide portion of the holding member includes a restriction portion configured to restrict the first specified portion of the cable from moving toward the openable unit.

11. The image reading apparatus according to claim 1, wherein, when the openable unit is in the closed position and the holding member is in the first position, the second specified portion of the cable is taut without slack.

12. The image reading apparatus according to claim 1, wherein, when the openable unit is in the closed position and the holding member is in the second position, the second specified portion of the cable is slack.

13. A method of manufacturing an image reading apparatus, the image reading apparatus including a main unit, an openable unit coupled to the main unit, a cable extending between the main unit and the openable unit, and a holding member configured to hold the cable routed in the main unit, the main unit including a document support surface configured to support a document on the document support surface, and a reading unit configured to read an image of the document supported on the document support surface, the openable unit being configured to move up and down relative to the main unit and to pivot about an axis between a closed position where the document support surface of the main unit is covered and a released position where the document support of the main unit is exposed, the openable unit including an electric component and a feeding unit configured to feed a sheet along a feed path, the reading unit of the main unit being configured to read an image of the sheet fed along the feed path, the cable being connected to the electric component of the openable unit and routed in the main unit, the holding member including a first guide portion configured to guide the cable in a specified direction within the main unit and hold a first specified portion of the cable routed in the main unit, the method comprising:

locating the openable unit in the closed position;

attaching the holding member, in a first position, to the main unit;

putting the cable in the holding member attached in the first position to the main unit such that the first guide portion holds the first specified portion of the cable and the cable has no slack in a second specified portion of the cable, the second specified portion being closer to an end of the cable disposed in the openable unit than the first specified portion; and moving the holding member from the first position to a second position such that the first guide portion holds the first specified portion of the cable and the cable is slack in the second specified portion of the cable, the holding member being closer to the openable unit in the second position than in the first position.

14. The method according to claim 13, wherein, in the attaching in the first position, the holding member is attached to the main unit with a jig between the holding member and the main unit.

* * * * *